United States Patent [19]
Gullett

[11] 4,319,904
[45] Mar. 16, 1982

[54] METHOD AND APPARATUS FOR GUIDING GLASS BATCH IN A GLASS MELTING FURNACE

[75] Inventor: Elmer G. Gullett, Cochranton, Pa.

[73] Assignee: PPG Industries, Inc., Pittsburgh, Pa.

[21] Appl. No.: 185,057

[22] Filed: Sep. 8, 1980

[51] Int. Cl.³ ............................................. C03B 3/00
[52] U.S. Cl. ......................................... 65/27; 65/134; 65/335
[58] Field of Search .................. 65/27, 134, 168, 206, 65/135, 335

[56] References Cited

U.S. PATENT DOCUMENTS

| | | | |
|---|---|---|---|
| 2,624,475 | 1/1953 | Henry et al. | 214/35 |
| 2,934,225 | 4/1960 | Serventi et al. | 214/18 |
| 3,294,506 | 12/1966 | Blaine | 65/27 |
| 3,495,966 | 2/1970 | West | 65/335 |
| 3,899,317 | 8/1975 | Heithoff | 65/135 |
| 3,941,576 | 3/1976 | Welton, Jr. | 65/135 |

Primary Examiner—Arthur D. Kellogg
Attorney, Agent, or Firm—Dennis G. Millman

[57] ABSTRACT

The batch layer in a continuous glass melting furnace is guided by means of an elongated, horizontally extending, rudder-like member inserted into the upper side of the batch layer.

18 Claims, 6 Drawing Figures

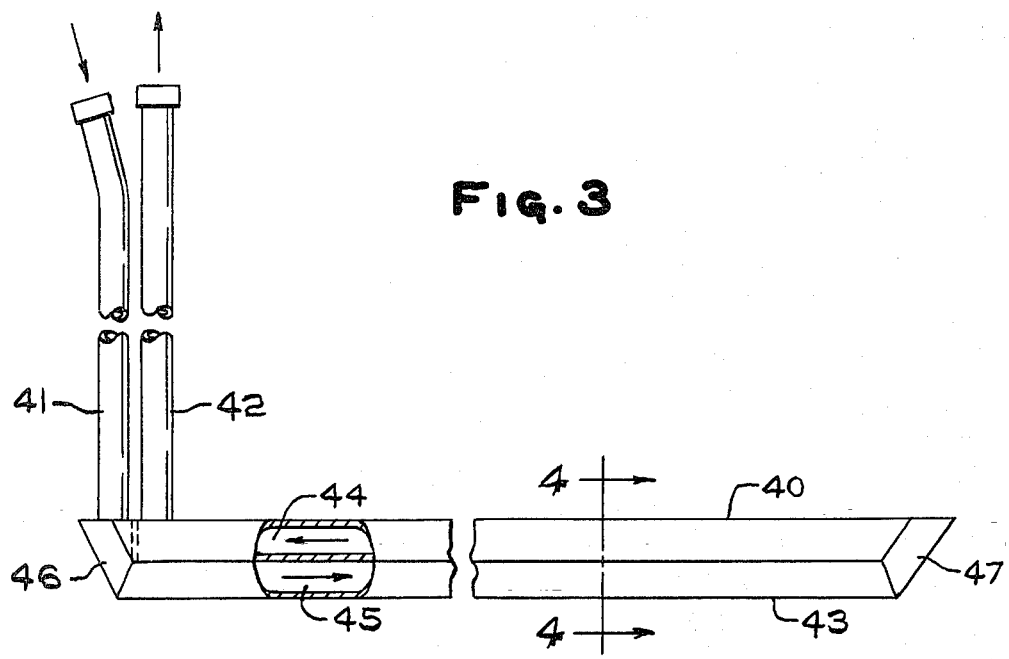
Fig. 3
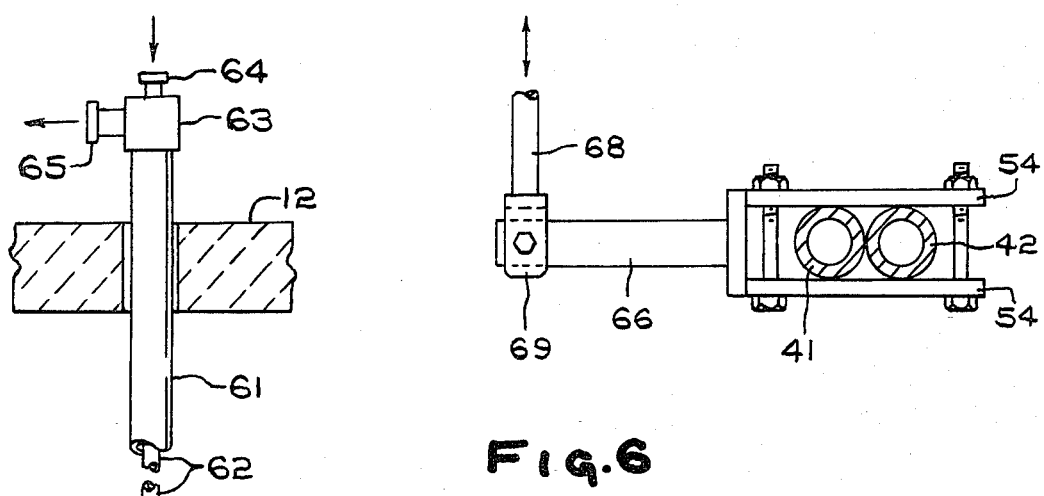
Fig. 5
Fig. 6
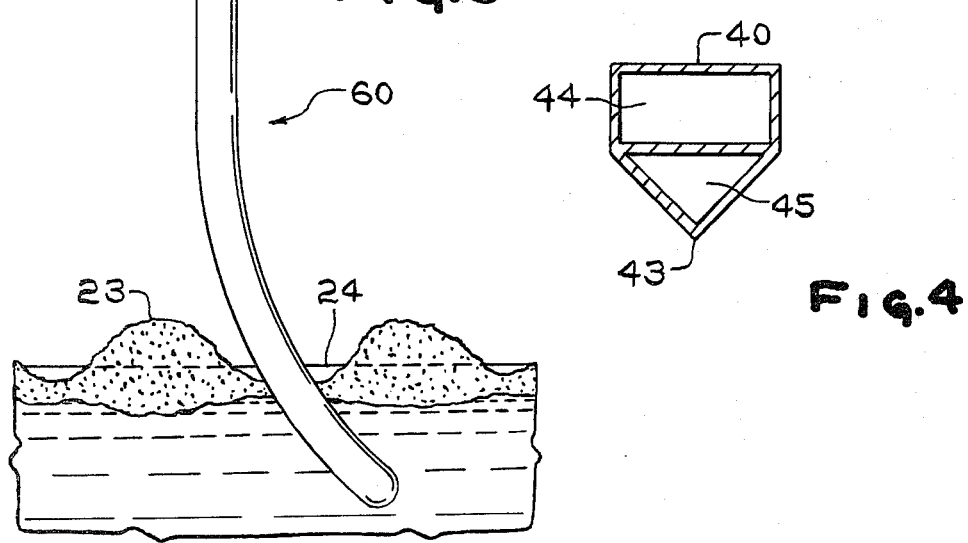
Fig. 4

METHOD AND APPARATUS FOR GUIDING GLASS BATCH IN A GLASS MELTING FURNACE

BACKGROUND OF THE INVENTION

This invention relates to improvements in continuous glass melting furnaces and, in particular, to improved means for providing directional stability to the unmelted layer of glass batch material that floats on the surface of the molten glass in such a furnace.

In a typical glass melting furnace of the continuous type, a body of molten glass is maintained in the furnace, and raw glass batch materials are fed through an inlet at one end of the furnace onto the surface of the pool of molten glass. There, the batch materials usually form an unmelted layer or "blanket" on the surface of the molten glass pool which may extend a considerable distance into the furnace until it becomes melted into the pool of molten glass. Heat for melting is provided within the furnace by combustion burners above the level of the molten glass, sometimes aided by submerged electric heaters. At the opposite end of the furnace from the inlet end, melted and reacted glass is withdrawn from the pool of molten glass through an outlet opening.

A problem commonly encountered in this type of glass melting furnace is that the batch layer occasionally tends to drift laterally toward or into contact with the sidewalls of the furnace. This lateral drifting can have severely detrimental consequences. One problem is that the unmelted or partially melted batch material is highly corrosive to the refractory materials from which the furnace walls are made, so that contact between the batch blanket and a sidewall promotes erosion of the sidewall. This erosion is detrimental not only because furnace life is shortened, but also because it causes greater numbers of particles from the walls to enter the molten glass, which, because they are difficult to melt, appear in the final glass product as defects. Another problem caused by the batch blanket drifting against a sidewall is that thermal conditions in the furnace are made unsymmetrical. When the batch layer shifts to one side, that side is shaded from the overhead heat sources and becomes cooler, while the opposite side of the furnace, which is then uncovered, becomes overheated. This thermal imbalance can create unwanted convection currents within the molten glass which tend to reinforce the buildup of batch against one sidewall. The result is that thermal efficiency of the melting operation deteriorates, and eventually the batch buildup may reach a point where proper melting has not been achieved in glass arriving at the outlet end of the furnace.

Various mechanical pushing or scraping means have been employed in the past for keeping the batch blanket centered in the melting furnace, but these have not been wholly satisfactory because their operation is intermittent and somewhat inefficient. One type of batch pusher may be seen in U.S. Pat. No. 3,294,506 to Blaine. U.S. Pat. No. 2,624,475 to Henry et al. shows a method of steering a batch blanket by causing its upper surface to drag against a transversely extending pipe. Such a technique appears to be incapable of correcting a batch blanket drift once it has occurred. Additionally, because the pipe reduces the thickness of portions of the batch blanket and retards the forward progress of portions of the batch blanket, it appears that such a technique would have a detrimental effect on the throughout of the furnace. U.S. Pat. No. 2,934,225 to Serventi et al. discloses a plow for dividing a batch blanket longitudinally, but the disclosed arrangement apparently has no steering effect on the batch blanket.

U.S. Pat. No. 3,495,966 to West shows a cooler inserted into the central area between a pair of parallel batch blankets so as to set up circulation patterns which tend to keep the batch away from the sidewalls of the furnace. The guiding effect is based solely on a thermal effect, and neither of the separate batch blankets is positively engaged by the guide means. That approach does not appear capable of imparting corrective steering to a batch blanket which may have drifted in spite thereof, and accordingly, that arrangement is preventive only and not corrective. The circulatory effect of the cooler is symmetrical, but the thermal conditions in the furnace may not be symmetrical, so drifting of a batch blanket may occur in spite of the patented arrangement. Moreover, the arrangement of the patent appears to be limited to use with a particular two-section type of feeder. The amount of heat extracted by such an arrangement may also be a drawback.

U.S. Pat. No. 3,899,317 to Heithoff discloses the use of a water coolant pipe engaging the downstream end of a batch blanket to prevent the batch blanket from drifting laterally. While this arrangement has been found to be useful, it does not offer the degree of control desired.

U.S. Pat. No. 3,941,576 to Welton shows the use of submerged barriers along the sides of a batch blanket for preventing lateral movement. This arrangement has proved to be highly successful in commercial flat glass melting operations, but in some cases a greater degree of freedom is desired. For example, it is sometimes desired to permit the downstream portions of the batch blanket, when it begins to disintegrate into free floating lumps of batch, to spread somewhat in order to take fuller advantage of the melting area of the furnace. The side barriers of the Welton patent do not permit such a spreading. At the same time, however, it is important to maintain the batch blanket centered within the furnace and stabilized against unsymmetrical lateral drifting.

Accordingly, a need has existed for a batch blanket stabilizing means which provides for a degree of freedom to the batch blanket while providing stabilization and enabling corrective manipulation in the event of any lateral drifting of the batch blanket.

SUMMARY OF THE INVENTION

In the present invention, a batch blanket in a glass melting furnace is guided by means of a horizontally extending rudder-like member which engages the upper surface of the batch blanket preferably near the inlet to the furnace. The rudder is rotatably mounted and may be employed to actively steer the batch blanket, although under normal operating conditions, the rudder would remain stationary and serve as stabilizing means to prevent lateral drifting of the batch blanket. The rudder is provided with sufficient length and penetration into the upper side of the batch blanket to enable the rudder to impart a strong tractive force laterally on the batch blanket. Typically, the rudder may be a hollow water-cooled metallic member. But because the rudder is in a relatively cool portion of the furnace, and because the support means may extend through the inlet opening rather than into the main portion of the furnace, heat loss due to the rudder is relatively low.

In one embodiment of the invention, the rudder member may be deployed in an upstream portion of the batch blanket and a batch-anchoring member such as in the above-mentioned U.S. Pat. No. 3,899,317 to Heithoff may be used in a downstream portion of the batch blanket so as to give positive control over both ends of the batch blanket.

THE DRAWINGS

FIG. 3 is an enlarged side view of a preferred embodiment of the batch rudder of the present invention.

FIG. 4 is a cross-sectional view of the batch rudder of FIG. 3 taken along lines 4—4.

FIG. 5 is a side view of the downstream batch anchor member of the alternate embodiment.

FIG. 6 is a plan view of a rotation mechanism for the rudder.

DETAILED DESCRIPTION

This description refers to a specific embodiment in connection with a type of furnace conventionally employed in the manufacture of flat glass, but it should be apparent that the advantages of the invention are applicable to various continuous glass-making operations.

Figure 1:
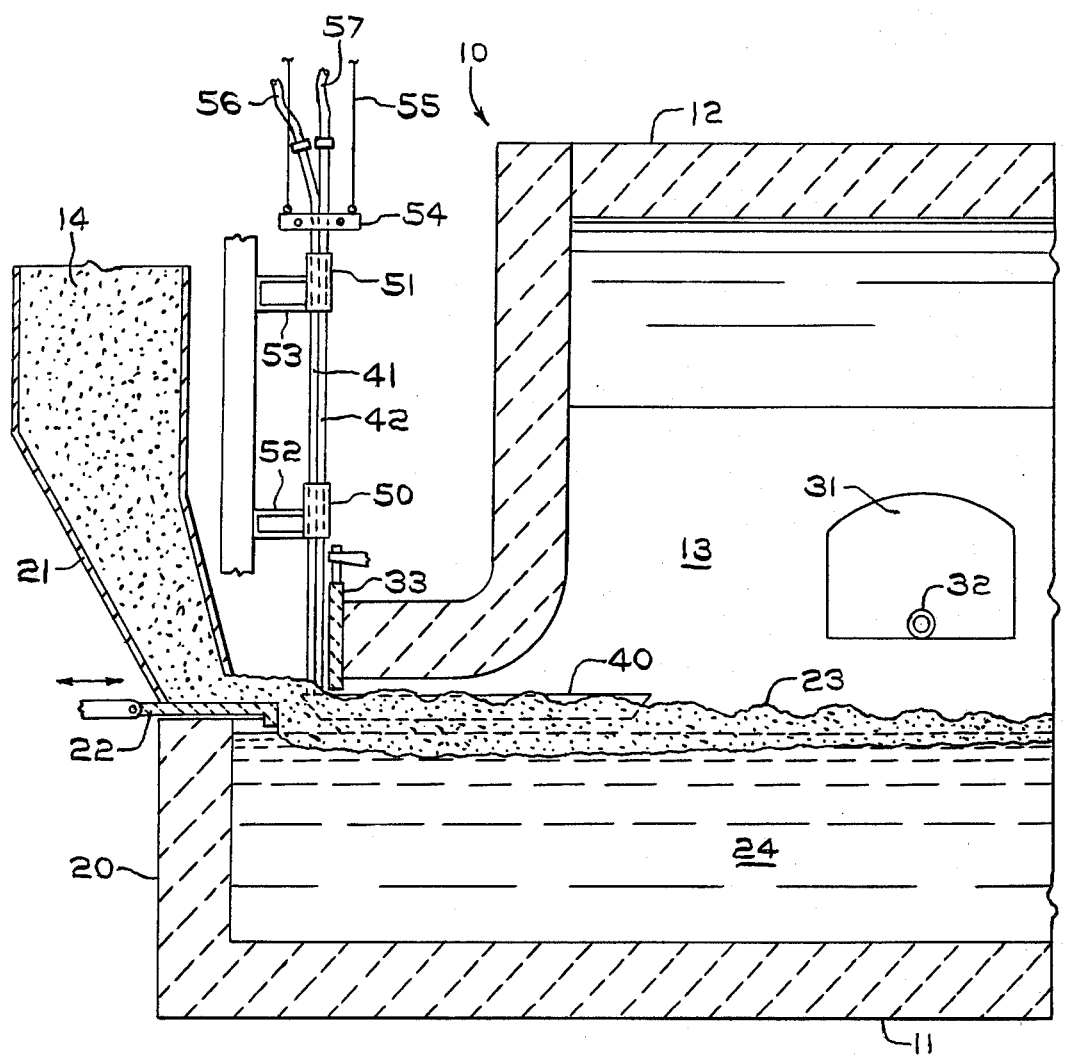
FIG. 1 is a schematic, cross-sectional, side view of an inlet end of a typical flat glass melting furnace incorporating the batch guide rudder of the present invention.
Figure 2:
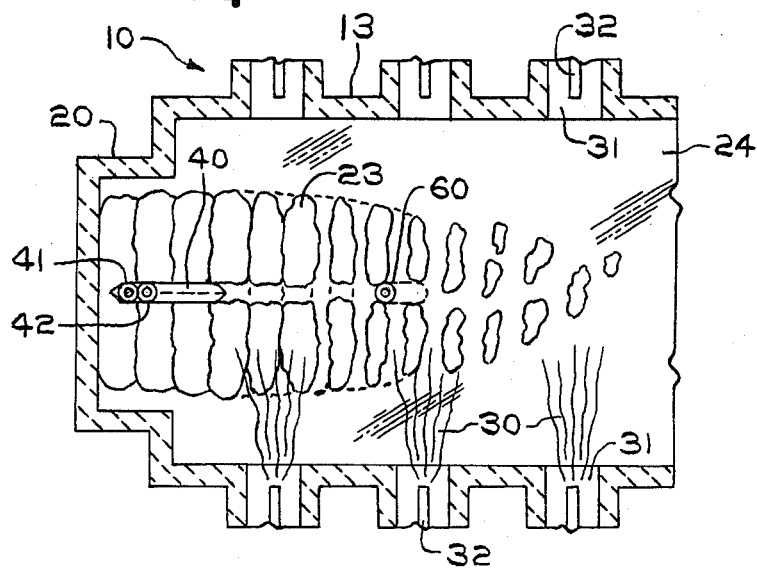
FIG. 2 is a cross-sectional plan view of the furnace of FIG. 1 on a reduced scale showing the rudder member being used in combination with a downstream batch anchor member.

Referring to FIGS. 1 and 2, there is shown a conventional, continuously fed, crossfired, regenerative, glass melting furnace having an enclosure formed by a bottom 11, roof 12, and sidewalls 13 made of refractory materials. Glass batch material 14 is fed through an inlet in an extension 20 of the furnace known as the fill doghouse. The batch materials 14 may be supplied by way of a chute 21 and intermittently fed into the furnace by means of a reciprocating tray-type feeder 22. Alternatively, the batch may be fed by a rotary-type feeder as shown in U.S. Pat. No. 2,829,784. As the batch is pushed forward by the feeder, it forms a blanket 23 floating on the surface of the molten glass 24 contained within the furnace. Overall progression of the glass is from left to right in the figures toward a longitudinally displaced outlet opening (not shown) at the opposite end of the furnace from the inlet opening. Heat is provided to the furnace enclosure by flames 30 issuing from burner ports 31 spaced along the sidewalls and which typically number from about 4 to 8 along each side of a flat glass melting glass. Each port 31 is provided with a burner tip 32 which supplies fuel to the port.

The rudder could be a corrosion-resistant refractory material, but the preferred embodiment described herein is a water-cooled metallic structure, preferably stainless steel. The rudder chiefly comprises a slender, elongated member 40 extending substantially horizontally and generally parallel to the direction of batch blanket movement (the longitudinal direction). Details of the construction of the rudder 40 may be seen in FIGS. 3 and 4. At one end of the rudder, coolant pipes 41 and 42 communicate with the internal passages 44 and 45 within the rudder. The incoming coolant, usually water, enters through conduit 41 to the lower passage 45, where it passes to the far end of the rudder and returns along upper passage 44 and thence leaves the rudder through conduit 42. The cross-sectional shape of the rudder may take any configuration, but it is preferred to provide the rudder with a blade-like shape with a pointed lower edge 43 in order to increase the tractive effect of the rudder on the batch layer. It is also desirable to taper the end portions 46 and 47 of the rudder so as to minimize the drag of the rudder on the batch blanket in the longitudinal direction.

Referring now to FIG. 1, rudder 40 may be mounted near the inlet opening of the furnace with the coolant pipes 41 and 42 extending vertically out of the opening just in front of the shade cooler 33. In some cases it may be desirable to notch the shade cooler 33 in order to provide clearance for the rudder 40. The coolant pipes are rotatably held within annular sleeves 50 and 51, which define a vertical axis of rotation for the rudder. The sleeves 50 and 51 may be mounted by way of brackets 52 and 53, respectively, to any suitable stationary structural support member. Coolant pipes 41 and 42 may be clamped at their upper ends by a pair of bolted plates 54, by way of which the entire rudder structure is provided with vertical support through cables 55 which lead to an overhead winch (not shown). The weight of the rudder and the coolant pipes cause the rudder to penetrate into the batch blanket, and the desired elevation is maintained by the winch. Normally, sufficient guiding effect is obtained with the rudder partially penetrating the batch layer so that the upper surface of the rudder remains at least partially visible. Deeper penetrations may be employed, but it would generally not be desirable to permit the rudder to come into connect with the molten glass underlying the batch blanket since that would, in effect, split the batch blanket, and the two halves would be free to drift apart. Flexible tubing 56 and 57 communicate with conduits 41 and 42 respectively for supplying and draining the coolant.

The rudder 40 preferably may be located approximately along the longitudinal centerline of the batch layer in order to avoid applying an unsymmetrical drag on the batch layer. However, since the drag caused by the rudder is minor, an off-center location may not be detrimental in some cases.

The rotational orientation of the rudder member may be locked in place by any suitable clamping means, an example of which is depicted in FIG. 6. There, a lever arm 66 engages one end of the clamping plates 54 by way of an end plate 67 welded thereto. The opposite end of the lever arm 66 is pivotably engaged with a clevis 69, to which is attached a control rod 68 which extends to an accessible location at the side of the furnace. By pushing or pulling the control rods 68, the rudder can be rotated through an angle of several degrees. Clamping the control rod in place fixes the angular orientation of the rudder. Typically, the rudder may be clamped into a longitudinally extending orientation (i.e. parallel to the center line of the furnace) so as to prevent lateral movement of the batch blanket as it progresses into the furnace. At other times, it may be desirable to fix the orientation of the rudder at a slight angle so as to counteract a drifting effect. In this latter case, the rudder would be tilted toward a sidewall opposite from that toward which the batch blanket is drifting. In yet another mode of operation, the rudder may be used to move the batch blanket laterally by rotating the rudder while it is embedded in the batch blanket. In this manner, a batch blanket which has begun to drift toward a sidewall may be returned to the center portion of the furnace.

The upstream end of the batch blanket is essentially laterally fixed, while the downstream end may drift laterally. Therefore, it can be said that the batch blanket rotates above a vertical axis near the inlet. It is advantageous for the axis of rotation of the rudder 40 to correspond approximately to the batch axis of rotation so that the rotation effects of the rudder directly counteract the rotational tendencies of the batch layer. Accordingly, a preferred location for the rudder is with its axis of rotation close to the inlet and on the centerline of the batch blanket. An additional benefit of supporting the rudder near the inlet is that the support means can conveniently extend through the inlet opening and therefore is not exposed to the hot furnace environment. The upstream end of the rudder typically may be no farther downstream than is necessary to avoid interference with the feeder mechanism, and at most no farther downstream than the end of the inlet extension of the furnace.

The length of the rudder will vary from one installation to another, depending upon the size of the furnace, the mass of the batch blanket, and many other variables. In any case, the longitudinal extent of the rudder should be sufficient to impart a substantial guiding effect upon a batch blanket with which it is engaged. In a furnace having an inlet extention, it is preferred that the rudder have a length at least as great as that of the inlet extension. In a typical commercial flat glass furnace producing about 400 to 800 tons of glass per day, it has been found desirable for the rudder to have a length of at least 1 meter and preferably to have a length in the range of about 1.5 to 3 meters. Even greater lengths would provide an additional degree of control but may be offset by difficulties in providing structural rigidity, awkwardness in inserting the rudder, and unnecessarily great heat extraction in the the case of a cooled rudder.

The rudder batch control device of the present invention itself provides an excellent means for providing directional stability to a batch blanket, but in some cases, it may be desired to provide even greater control by employing the rudder in combination with other batch control devices. In particular, the rudder is highly compatible for use in combination with an anchoring pipe of the type shown in U.S. Pat. No. 3,899,317 (Heithoff). Such an anchoring pipe, designated generally as 60, as illustrated in FIG. 5. In one embodiment, the anchor pipe 60 may include a pair of concentric pipes 61 and 62 for providing countercurrent coolant flow within the pipe. The pipe may be curved slightly at its lower end in the downstream direction. The upper end of the anchor pipe 60 extends through an opening in the furnace roof 12, above which the pipe is capped with a union 63 provided with an inlet 64 for coolant and a drain connection 65. As shown in FIG. 2, the anchor pipe 60 may be deployed at a downstream end of the batch blanket, while the rudder 40 operates at the upstream end, thereby substantially fixing the lateral position of the batch blanket along its entire length. Additional details regarding the construction and operation of the anchor pipe 60 may be found in the aforesaid U.S. Pat. No. 3,899,317, the disclosure of which is hereby incorporated by reference.

Although it does not appear to be necessary, it would be possible to implement the present invention with two or more rudders rather than a single rudder. In such a case, the rudders could be spaced a substantial distance from the centerline of the batch blanket, preferably symmetrically spaced about the centerline. It would also be feasible to employ a plurality of the rudders in series with one another so as to form an extended line of guidance (which need not be a straight line) for the batch blanket.

Other variations and modifications as would be known to those of skill in the art may be employed in conjunction with the present invention without departing from the spirit and scope of the invention as defined by the following claims.

I claim:

1. In a continuous process for melting glass, wherein raw glass batch materials are fed through an inlet opening at one end of an elongated melting furnace and form a floating layer on the surface of a pool of molten glass contained within the furnace, and the batch layer progresses in a generally longitudinal direction from said one end toward a center portion of the furnace until the batch materials become liquified by heat within the furnace, the improvement comprising engaging an extended upper surface portion of the batch layer with a horizontal bottom surface portion of an elongated rudder member having a substantial linear extent horizontally from a location closely adjacent to the inlet opening in generally the longitudinal direction, and maintaining the bottom surface portion of the rudder member embedded within the upper portion of the batch material to a depth which avoids dividing the batch layer but sufficient to restrain the batch layer against lateral drifting.

2. The method of claim 1 wherein the rudder member is maintained at an orientation parallel to the longitudinal centerline of the furnace, whereby the rudder member retards any lateral drifting of the batch layer toward sidewalls of the furnace.

3. The method of claim 1 wherein the batch layer tends to drift toward a side wall of the furnace and the rudder member is maintained at an angle relative to the longitudinal centerline of the furnace so as to counteract said drifting.

4. The method of claim 1 wherein the rudder member is rotated while engaging the upper surface of the batch layer so as to rotate the batch layer, thereby correcting a lateral drift of the batch layer.

5. The method of claim 1 wherein the rudder member engages the upper portion of the batch layer along a length of at least 1.5 meters.

6. The method of claim 1 wherein heat is provided to the interior of the furnace by means of a plurality of burner ports spaced along the sides of the furnace and the rudder member extends in the downstream direction no farther than the region opposite the first of the burner ports.

7. The method of claim 1 wherein the lower extremity of the rudder member is blade-like in configuration.

8. The method of claim 1 wherein a downstream portion of the batch layer is restrained against lateral movement by a second batch-engaging means contacting a central portion of the batch layer at a location longitudinally spaced from the rudder means in the downstream direction.

9. In a continuous glass melting furnace provided with an inlet at one end, and feeding means at the inlet for feeding a layer of glass batch materials onto a pool of molten glass contained within the furnace and for moving the batch layer in a longitudinal direction into the furnace, the improvement comprising an elongated rudder member extending horizontally from a location closely adjacent to the inlet in generally the longitudinal direction and having a horizontal bottom surface of substantial linear extent, the bottom surface portion being supported at an elevation so as to be embedded within the upper portion of the batch layer to a depth sufficient to restrain the batch layer against lateral drifting but avoiding dividing the batch layer.

10. The furnace of claim 9 wherein the rudder member comprises a water-cooled conduit.

11. The furnace of claim 9 wherein the rudder member is supported by means extending through the inlet.

12. The furnace of claim 11 wherein the support means are provided with rotary motion about a substantially vertically extending axis.

13. The furnace of claim 9 wherein the rudder member has a length of at least 1.5 meters.

14. The furnace of claim 9 wherein the rudder member has a lower extremity provided with a blade-like configuration.

15. The furnace of claim 9 wherein a plurality of burner ports are spaced apart along the sidewalls of the furnace for providing heat for melting the glass, and the rudder member extends from the vicinity of the inlet in the longitudinal direction to a location no farther than a region opposite the first of the burner ports.

16. The furnace of claim 9 wherein a second batch restraining member is provided at a location longitudinally spaced from the rudder member.

17. The method of claim 1 wherein contact is maintained between the rudder member and the batch layer along an essentially horizontal line for a length of at least one meter.

18. The apparatus of claim 9 wherein said rudder has a horizontally extending essentially linear bottom edge having a length of at least one meter.

* * * * *